INVENTORS
Einar Thoresen
Walter H. Marsh
By Lewis T. Konigsford
ATTORNEY.

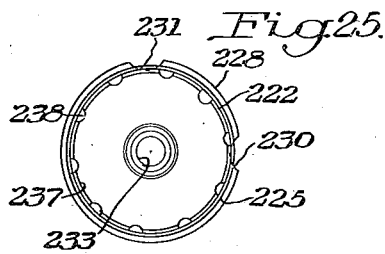
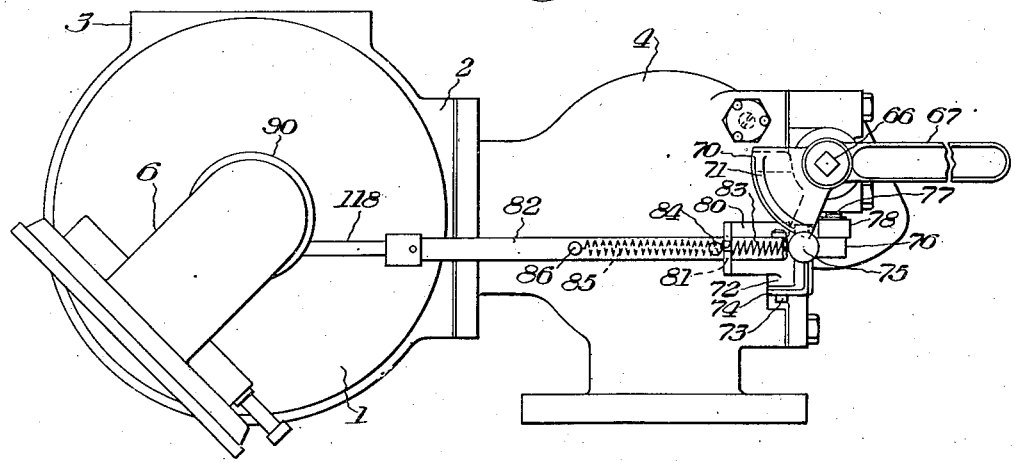
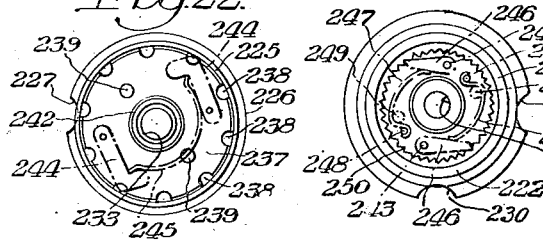
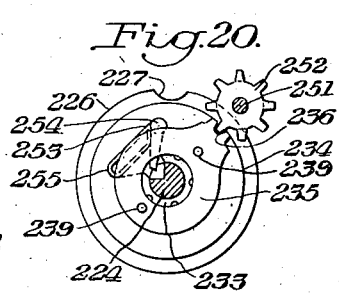
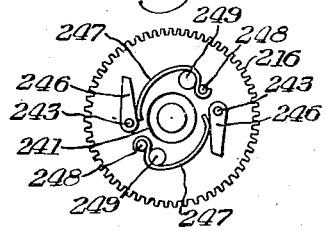
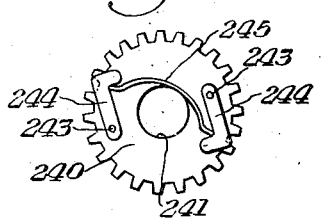

Aug. 14, 1945.  E. THORESEN ET AL  2,382,454
PREDETERMINING DISPENSING APPARATUS
Filed Dec. 14, 1939  5 Sheets-Sheet 3
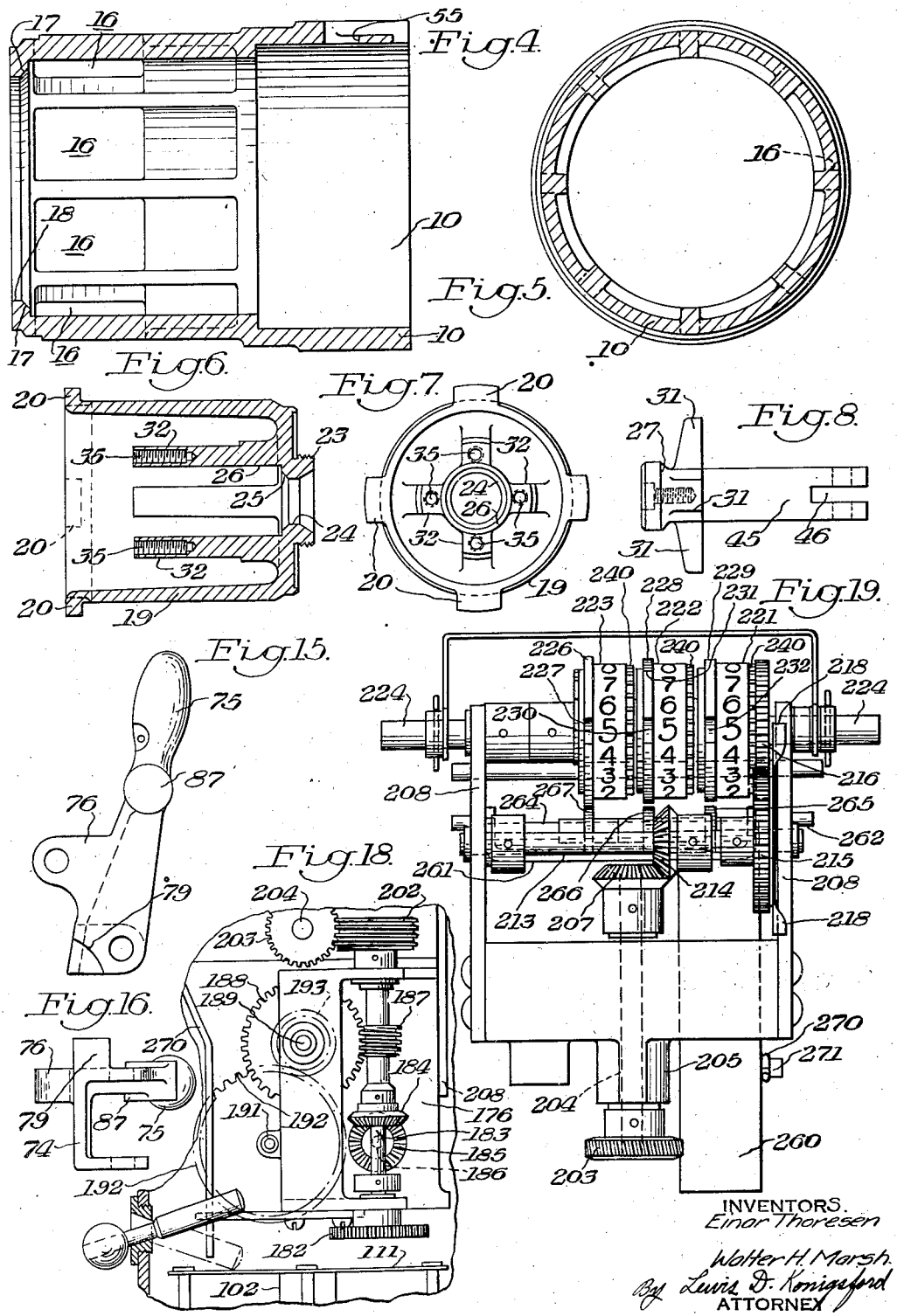

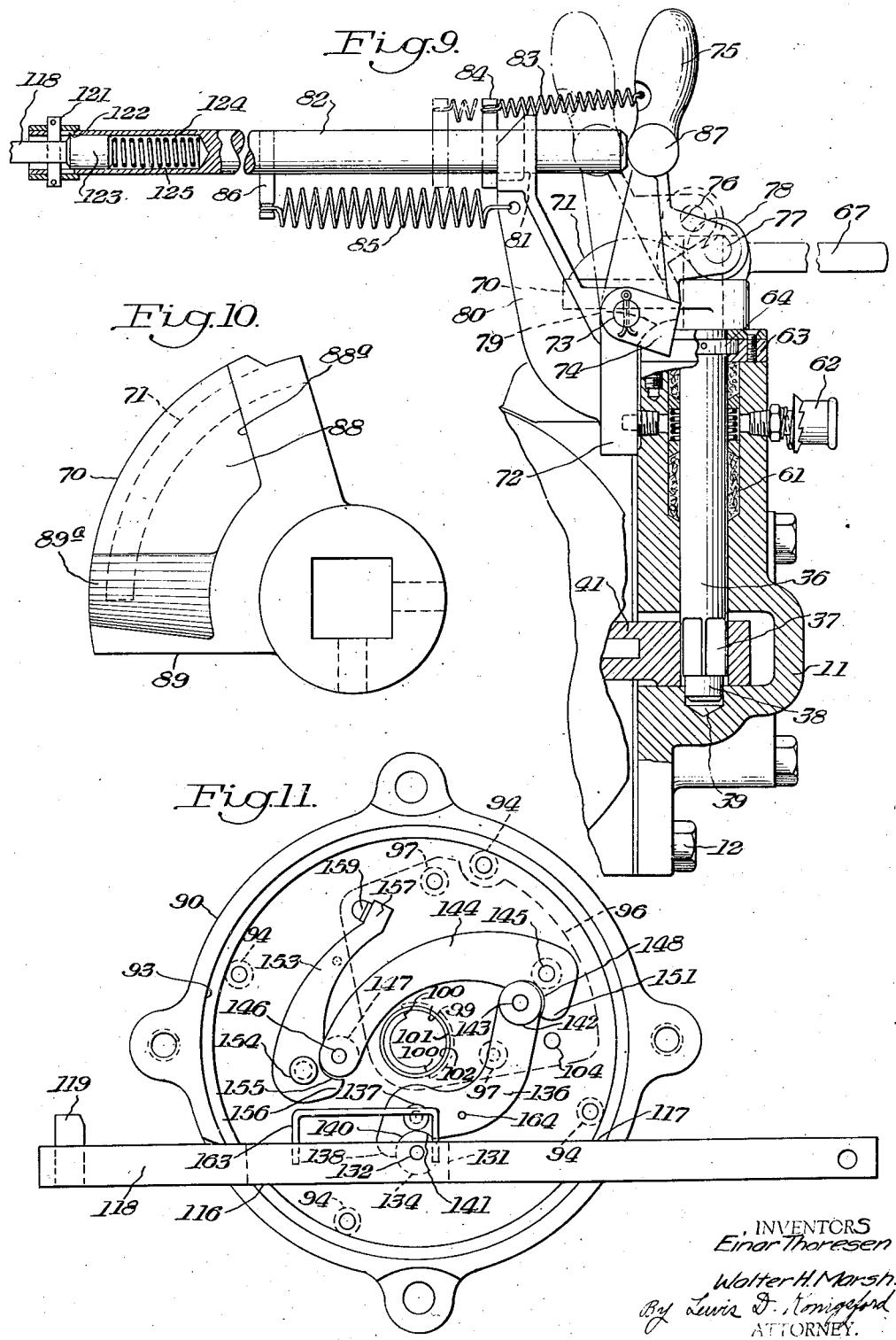

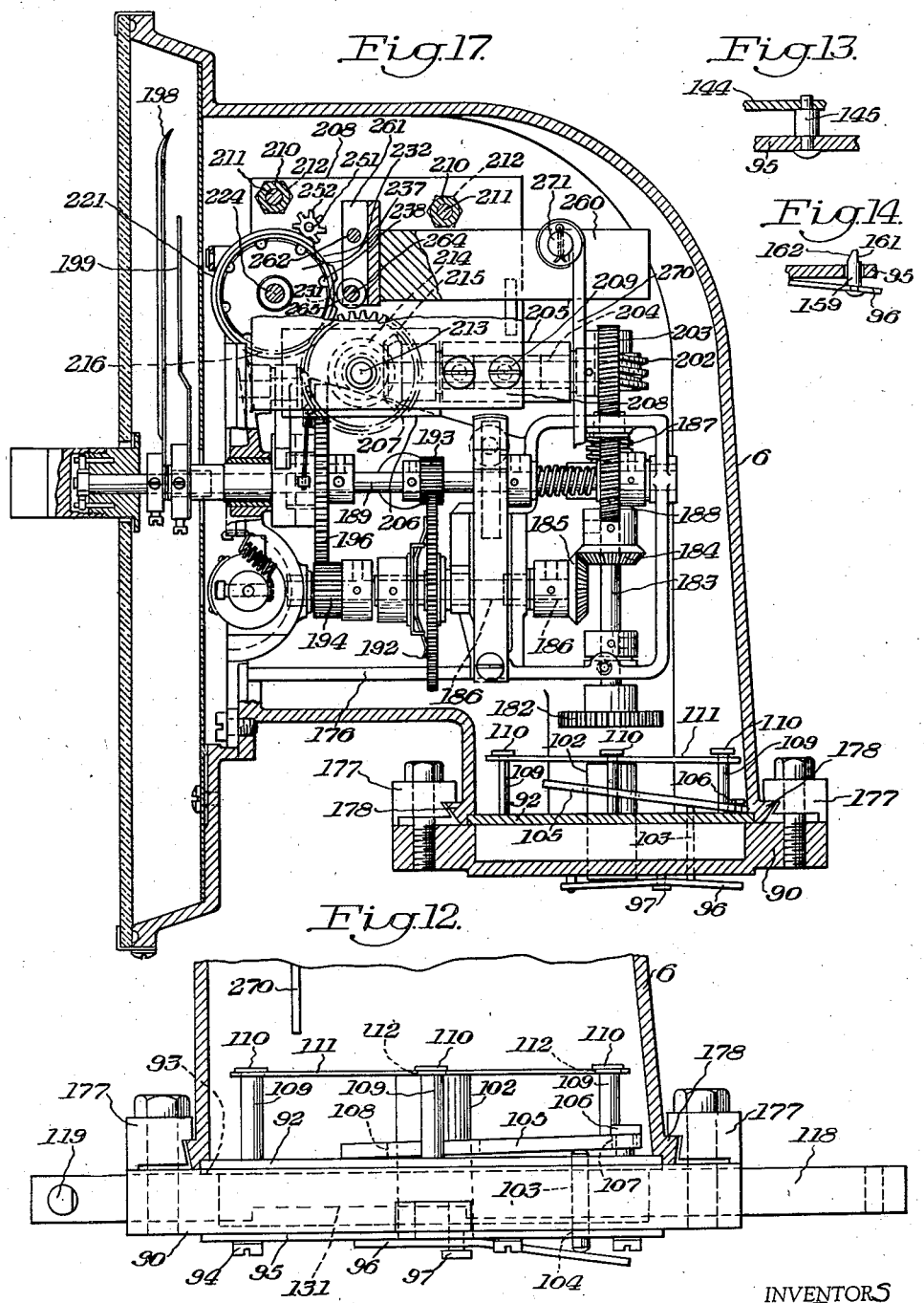

Patented Aug. 14, 1945

2,382,454

UNITED STATES PATENT OFFICE 2,382,454

PREDETERMINING DISPENSING APPARATUS

Einar Thoresen, Pittsburgh, and Walter H. Marsh, Crafton, Pa., assignors to Pittsburgh Equitable Meter Company, Pittsburgh, Pa., a corporation of Pennsylvania Application December 14, 1939, Serial No. 309,196

25 Claims. (Cl. 222—14)

The present invention relates to dispensing apparatus for delivering a predetermined quantity of fluid and automatically shutting off the flow of fluid when the desired quantity of fluid has been delivered, and is an improvement on the construction shown and described in the copending application of Einar Thoresen and George J. Genung, Serial No. 64,118, filed February 15, 1936, for Predetermining dispenser, issued June 24, 1941 as Patent No. 2,247,139.

In predetermining apparatus of the type exemplified by said Thoresen and Genung application, a sensitive latch mechanism is employed to release the valve when the predetermined quantity of fluid desired has passed through the valve. However, in dispensing large quantities of fluid at high velocity the valve latch mechanism may be called upon to resist considerable force and is subject to considerable shock that is liable to break or excessively wear the latch mechanism.

According to the present invention, I employ a separate latching mechanism for the valve and a pilot latch mechanism adapted to be tripped by the predetermining means and release the valve latching mechanism. Preferably, to avoid the water hammer resulting from a quick cutoff when the predetermined quantity of fluid to be dispensed is approached, the valve means is unlatched and relatched in partly open position to allow a reduced flow therethrough until the predetermined quantity of fluid has been dispensed, whereupon the valve means is completely closed. In the preferred embodiment the valve means comprises a large valve and a small valve, and the latching mechanism for the large valve is released to reduce the rate of flow while retaining the small valve in open position until the predetermined quantity has been delivered, whereupon the small valve is closed to stop the flow. This preferably is accomplished by a single latching mechanism which retains both the valves in open position and releases first the large valve and then the small valve. The present invention may be employed to secure a multiplicity of deliveries in conjunction with a mechanism for resetting the predetermined delivery counter.

The preferred embodiment of valve means comprises a valve movable in a cage and which has a substantially cylindrical shield for the upstream or pressure side of the valve, so that the valve is shielded from the impact or velocity energy of the fluid passing therethrough. A passage through the cage to the upstream side of the valve, preferably removed from the velocity effect of the fluid, is provided to enable the valve to be operated. If desired, this passage may be restricted to secure a damping action for retarding closing movement of the valve, and an adjustment of the size of this passage may be provided to adjust the closing rate of the valve. If desired, a pilot valve may be provided in the main valve to facilitate opening of the main valve, and preferably the passage provides a fluid flow to the pilot valve.

It is an object of the present invention to provide a predetermined delivery apparatus which will permit dispensing at a greater rate of flow than heretofore has been employed.

Another object is the provision of a predetermining dispensing system wherein the shock incidental to rapidly cutting off the rate of flow of fluid is substantially eliminated.

Still another object is the provision of a predetermining dispensing apparatus wherein predetermined quantities may be dispensed with excellent accuracy.

Another object is the provision of a predetermining dispensing apparatus adapted for high rates of flow which requires relatively small effort to open the valve to initiate operation thereof.

These and other objects of the invention will be apparent from a consideration of the following specification taken in connection with the accompanying drawings, wherein we have illustrated a preferred embodiment of the invention by way of example, and wherein:

Figure 1 is a plan view showing a preferred embodiment of the invention,

Figure 4 is a horizontal section of the valve cage,

Figure 5 is a vertical section on line V—V of Figure 2 of the valve cage,

Figure 6 is a section of the main valve,

Figure 7 is an end elevation of the main valve,

Figure 8 is an elevation of the secondary valve,

Figure 3:
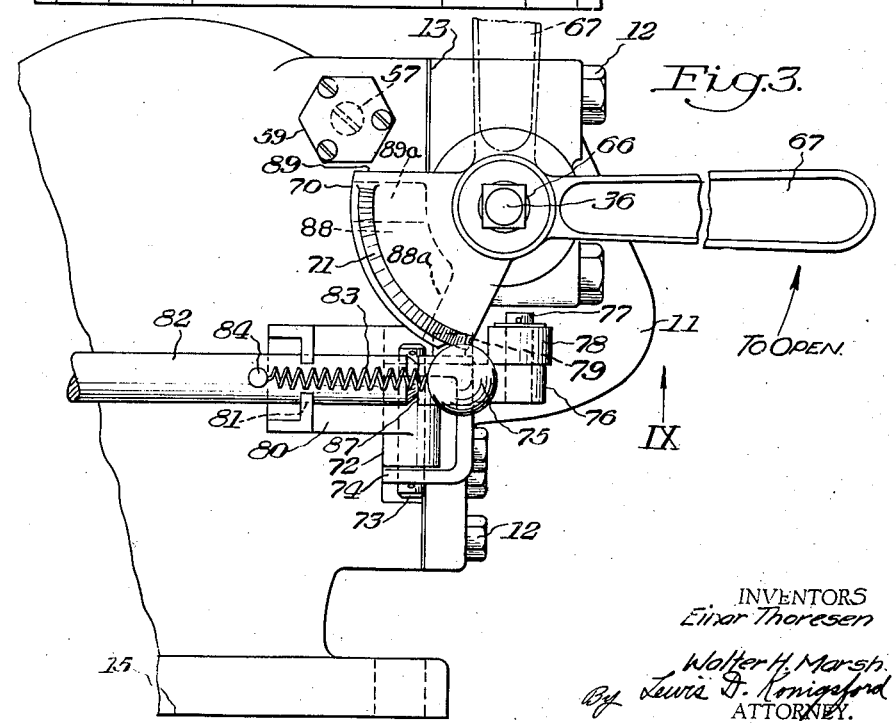
Figure 3 is an enlarged plan view of the valve cam and valve locking mechanism.

Figure 9 is a side elevation of Figure 3 looking in the direction of the arrow on line IX, certain parts being in section, Figure 10 is a bottom elevation of the valve cam, Figure 11 is a plan view of the latch case with the cover removed, Figure 12 is an end elevation of Figure 11, including a fragment of the register case, Figure 13 is a vertical section of a detail of the latch mechanism, Figure 14 is a vertical section of a detail of the release plate and latching pin, Figure 15 is a side elevation of the cam handle, Figure 16 is a bottom elevation of Figure 15, Figure 17 is an elevation of the predetermining register with the case and certain parts in section, Figure 18 is a side elevation of Figure 17, certain parts being omitted, Figure 19 is a bottom elevation of the predetermining counter sub-assembly, and Figures 20 to 25 show details of the predetermining counter wheels.

Referring to the drawings, Figure 1, there is diagrammatically shown a fluid flow responsive means, such as a liquid meter 1 having an inlet 2 and an outlet 3 to which is suitably connected a valve casing, indicated generally by the numeral 4. The meter may be of any suitable construction or type, the preferred construction being shown and described in the application of Walter H. Marsh, Serial No. 179,394, filed December 13, 1937, and issued February 24, 1942, as Patent No. 2,274,206. A register case, indicated generally by the numeral 6, is secured to the meter in any suitable manner, and preferably is arranged to pivot relative to the meter, as will hereinafter be described.

The valve means is enclosed in a casing 4 (Figure 2) which has an internal shoulder 7 providing an orifice 8 therethrough, and a gasket 9 is seated on the interior face of this shoulder. A valve cage 10 engages the gasket 9 at one end and is held in place in engagement therewith by a cover 11 suitably secured to the casing by bolts 12, and a gasket 13 is interposed between the cage and cover extending over the end of the cage. A dowel 14 locates the cage and holds it in non-rotatable position relative to the casing. Cage 10 communicates with the valve inlet 15 by a plurality of ports or openings 16 (Figures 2 and 4) in the periphery thereof, and has a valve seat surface 17 formed on its interior flange surrounding the opening 18. A large valve 19 having a sleeve or shield 19' (Figures 2, 6 and 7) is slidably received on the interior of cage 10, sleeve 19' having guiding lugs 20 at its upper end. Valve 19 carries a soft valve member 21 which is held thereon by a nut 22 threaded on an extension 23 at the end thereof. Valve 19 has a bore 24 therethrough terminating in a valve seat 25. A counterbore 26 provides a guide to receive a second smaller valve 27 (Figures 2 and 8) movable therein and carrying a seating washer 28 clamped in place by a flanged bushing 29 and a screw 30. Valve 27 has wings or extensions 31 which extend between the posts 32 on the interior of valve sleeve 19' (Figures 2, 6 and 7) and a spring 33 abuts the wings 31 to urge valve 27 against its seat, the opposite end of the spring being retained by a flanged bushing 34 held on the end of posts 32 by suitable screws received in the holes 35 (Figure 6).

Figure 2:
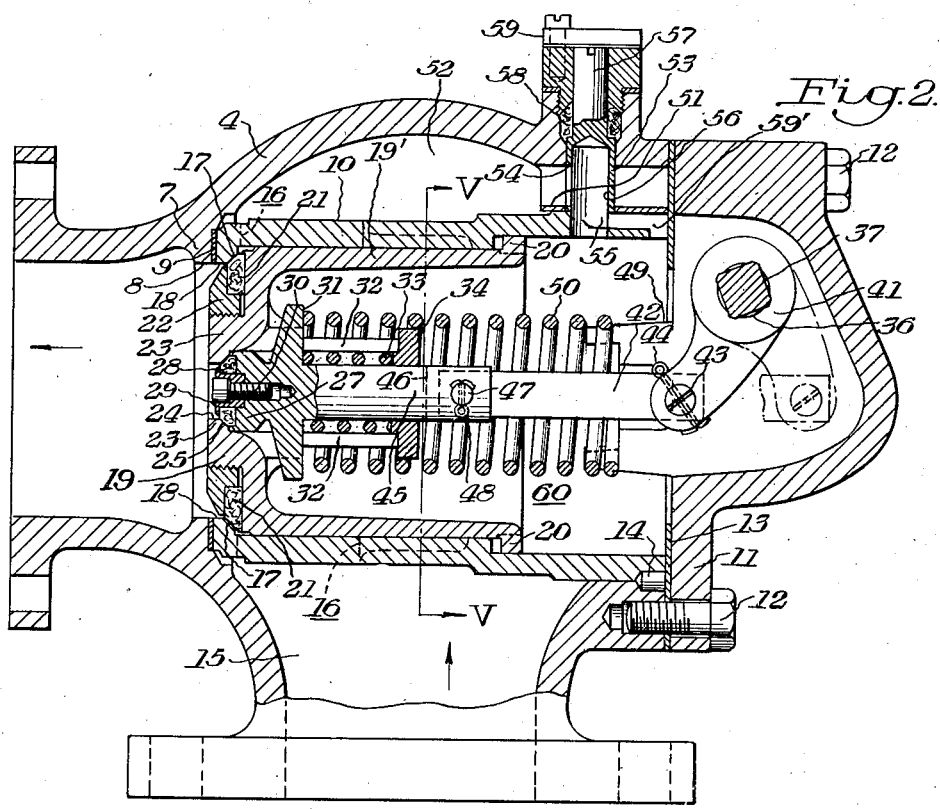
Figure 2 is a horizontal section of the valve.

As seen in Figures 2 and 9, an operating stem 36 for the valve means having a squared end 37 extends through the cover 11 and its interior end 38 is received in a suitable bearing recess 39 in the cover. A bifurcated operating arm 41 receives the squared end 37 of the operating stem and a link 42 is received in the bifurcation and is secured in place by means of a pin 43 and a cotter pin 44. The opposite end of link 42 is received in a bifurcation 46 (Figures 2 and 8) in the end of valve stem 45 and is retained in position by a pin 47 and a cotter pin 48. The cover 11 has bosses 49 (Figure 2) extending therefrom which serve as an abutment for one end of spring 50. The other end of the spring surrounding posts 32 and guided thereby engages the extensions 31 of valve member 27.

When operating stem 36 is rotated to rotate lever 41, the action will be to first unseat valve 27 against the bias of springs 33 and 50 because the fluid behind large valve 19 tends to keep the large valve on its seat. The opening of small valve 27 allows a flow to take place from chamber 52 and passages 51 and 56 into chamber 60, and through the valve to reduce the pressure difference between the upstream and downstream sides of valve 19, thus making valve 19 easier to open. Continued movement of stem 36 until spring 33 is substantially completely compressed, causes valve 19 to be opened so that when stem 36 is locked in this position both valves are thus held open. The fluid then flows from inlet 15 through ports 16 and through the space between seat 17 and valve 19. As there is only a small connection from chamber 52 by passages 51 and 56 to the rear of the valve 19, there is substantially no impact pressure exerted on valve 19. The valves open against the upstream side of the line fluid flow, and the pressure difference on opposite side of valve orifice 8 and the springs 33 and 50 tend to close the valves. However, valve 19 can close independently of valve 27 under the action of line pressure when valve 27 is held at an intermediate point, as will hereafter appear.

A dash pot action is provided to damp the closing movement of valve 19. Casing 4 has a bore 51 communicating with a chamber 52 surrounding cage 10, and a hollow throttle pin 53 passes through the bore 51 and has a hole 54 communicating therewith. The valve cage has a hole 55 through a web in its wall connecting with the bore 56 in the throttle pin. The outer end 57 of the pin passes through a suitable stuffing box 58 and has a kerf in its end whereby it may be rotated. A cover 59 normally closes the end of this pin. When valve 19 closes, fluid is forced from chamber 52 through hollow throttle pin 53 and hole 54 into the space 60 behind the valve, and by rotating pin 53 the size of opening 54 and hence the throttling action may be adjusted. An auxiliary passage 59' permits flow when opening 55 is closed by one of the lugs 20 of valve 19.

Operating stem 36 passes through a stuffing box 61 (Figure 9) which may be lubricated through a suitable grease fitting 62, the stuffing box being closed by a cap 63 which receives a flange 64 of the operating stem. The outer end of operating stem 36 is squared as indicated at 66 (Figure 3), and carries a cocking handle 67 by which the valves may be opened manually. Stem 36 carries part of the valve latching means and part of the cocking mechanism for a pilot latching means, as will hereinafter appear. A cam member, indicated generally at 70, secured to the upper end of stem 36, has a curved track 71 concentric with its periphery on its upper surface. A bracket 72 (Figures 3 and 9) secured to the valve case, has a pin 73 passing therethrough, and through the yoke 74 (Figures 3, 9, 15 and 16) of a handle or follower 75, whereby the follower is pivotally secured to the bracket. Follower 75 has an extension 76 having a pin 77 secured therein upon which is journalled a roller 78 adapted to operate on the top face of cam track 71. A quadrant shaped extension or valve latching piece 79 also extends from follower 75 and is depressed below the plane of cam 70 in unlatched position. Bracket 72 has an extension 80 having a hole 81 therein providing a guide for a valve latch releasing member in the form of a striker member or relatively heavy impact rod 82 which is longitudinally movable therein. A spring 83 is secured at one end to a pin 84 in the rod 82, and passes through a slot in bracket extension 80, the other end of spring 83 being suitably fastened to follower 75. Thus bar 82 is urged against boss 87 on follower 75 by spring 83 and the follower and bar are constrained to move together. A second spring 85 is secured to a pin 86 in bar 82 and has its other end secured to bracket 80 whereby bar 82 is biased to the right as seen in Figure 9.

When cocking lever 67 is turned counterclockwise, as viewed in Figure 3, to open the valve means, the elevated cam track 71 passes under roller 78, thus pivoting follower 75 to the left to the dot and dash line position, as seen in Figure 9, and boss 87 on follower 75 pushes rod 82 to the left against the bias of spring 85, in which position it is retained by a pilot latching mechanism presently to be described. Spring 83 draws and resiliently holds the follower 75 to the left. A recess 88 is provided in the under face of the cam to provide a locking edge 88a. As hereinbefore described, initial rotation of stem 36 first opens the small valve 27 and upon continued rotation of stem 36 sufficient to bring roller 78 to nearly the mid point of the cam track 71, bar 82 is latched. Continued rotation of stem 36 carries the mid point of cam track 71 under and beyond roller 78 and further opens valve 19 until the cam surface 89a rides over latch piece 79 and pivots follower 75 to the right and away from rod 82 against the resistance of spring 83, so that when the cam edge 89 becomes disposed beyond the latch piece 79, spring 83 returns follower 75 to abutting contact with rod 82 and lifts the latch piece 79 into latching relation with the cam edge 89. As the path of travel of the cam 70 is slightly above the center of pivot 73, the engagement of cam edge 89 with latching piece 79 will bias follower 75 to the left and prevent return movement of stem 36, so that valves 19 and 27 will be held open.

A pilot latch case 90 (Figures 1, 11, 12 and 17) which encloses the pilot latch mechanism, is substantially cup shaped and has a cover plate 92 therefor which is held in position against an internal shoulder 93 by suitable screws 94 passing through the bottom of the latch case. The bottom 95 of the case 90 carries a bent release plate 96 loosely pivoted on the line of bend by two headed pins 97, the plate being shown in one extreme position in Figure 12. Release plate 96 has a hole 99 in the corner terminating in knife edges 100, and a hole 101 located in the bottom of the case 90 allows the lower end of a tube 102 to pass therethrough and rest on the knife edges 100 of the release plate, which provide a bearing edge therefor. A pin 203 passing through suitable holes 104 in the top cover and bottom of the case has its lower end resting on the offset portion of release plate 96 and an elongated weight 105 loosely pivoted at one end by the headed pins 106 passing through enlarged holes 107 in the weight, rests on pin 103, thereby holding plate 96 in the position shown in Figure 12.

The upper end of tube 102 extends through a suitable opening in the top cover and an enlarged hole 108 is provided in the weight 105 to accommodate the tube 102. The top plate 92 has four guide posts 109 riveted thereto which have heads 110 at their upper ends, and a thin disc or floating member 111 is held in elevated position against heads 110 by tube 102 and has holes 112 therein loosely fitting over the guide posts 109 so that the plate 111 is capable of universal rocking or tilting movement on the end of the tube 102.

It will be evident from the construction so far described that the weight 105 bearing on pin 103 depresses the right end of release plate 96, as seen in Figures 11 and 12, and the opposite end of the release plate bears upwardly against the lower end of tube 102, holding it in elevated position, and thus holds the disc 111 in its uppermost position against guide post heads 110, as seen in Figure 12.

The case 90 is cut out at 116 and 117 (Figure 11) to receive a slide bar 118 having a stop pin 119 extending therethrough at one end to limit its lengthwise movement in one direction through the case. Bar 118 is secured to bar 82 (Figure 9) by a pin 121 passing through a slot 122 in the hollow end of bar 82, and a piston 123 is urged by spring 124 in the bore 125 against the end of bar 118 to absorb any shock. The bar 118 is cut out at its bottom, as indicated at 131 (Figures 11 and 12) and has a pin 132 suitably secured therein which receives a roller or catch member 134 located in the recess 131. A curved lever 136 is pivoted on a headed pin 137 riveted to the bottom of the casing 90, and has a cocking tail 138 which passes into the recess 131 in the path of roller 134. Adjacent the tail 138 the lever is cut out at 140 substantially concentric with roller 134. It will be evident that upon sliding motion of the bar 118 to the left, the roller 134 engages the tail 138 and swings the lever 136 about the pin 137 as a pivot in clockwise direction, and upon movement of bar 118 to the right the roller 134 engages retaining shoulder 141 on the lever 136 to swing the lever counterclockwise.

The lever 136 carries a roller 142 pivoted on a pin 143 at the end thereof. A second or intermediate curved lever 144 is pivoted on a shouldered pin 145 (Figures 11 and 13) riveted to the bottom of the case 90, and carries a pin 146 at its opposite end with a roller 147 mounted thereon, and it will be seen that the shouldered pin 145 and the pin 146 maintain the lever 144 elevated from the bottom of case 90 in the plane of roller 142. The lever 144 has a recess 148 substantially conforming to the circumference of roller 142, which provides a tail 151. It will be evident that when the lever 136 moves in clockwise direction it engages the tail 151 and swings the lever 144 counterclockwise about the pivot pin 145.

A third or latch lever 153 is pivoted on a headed pin 154, the pivot pins 145 and 154 being preferable but not necessarily substantially diametrically opposite. The latch lever 153 has a cut out portion 155 which is cut substantially on the radius of roller 147 and provides a tail 156. Lever 153 has a straight end portion 157 at its free end. When lever 144 is rotated counterclockwise, roller 146 engages the tail 156 and rotates the latch lever 153 in a clockwise direction about the pivot 154. A detent pin 159 (Figures 11 and 14) is riveted or otherwise secured to one corner of the release plate 96 and extends with a loose fit through a suitable hole in the bottom 95 of casing 90 into the path of lever 153. This pin has a flat side portion 161 adjacent its end and the opposite side of the pin is cut on a bevel, as indicated at 162. From the foregoing description it will be evident that when the bars 118 and 82 are in the cocked position shown in Figures 11 and 12, they are biased to the right by the spring 85 (Figure 9) and the roller 134 engages the forward shoulder 141 of recess 140 and tends to rotate lever 136 counterclockwise, but due to the latching of lever 153 by pin 159, and retention of lever 144, the lever 136 is not free to rotate, so that the bar 118 is held by shoulder 141 against movement to the right. The only strain on the pilot latch mechanism is due to spring 85, so that the strain is constant regardless of the rate of flow through the valve means. A wire guard member 163 in bar 118 cooperating with a pin 164 in lever 136 is provided to prevent lever 136 accidentally rebounding into cocked position after the latch mechanism has been released, for if this occurred, shoulder 141 would prevent the bar 118 from being moved to the left to recock the mechanism.

Operation of handle 67 in counterclockwise direction, as hereinbefore described, initially opens the small valve 27 and rotates cam member 70 to cause edge 71 to ride under roller 78, and moves follower 75 counterclockwise to the dot and dash line position, as shown in Figure 9. Boss 87 on follower 75 engages and moves bar 82 and bar 118 coupled thereto to the left, thus causing roller 134 on bar 118 in the latch box to engage tail piece 138 (Figure 11) and cock the pilot latch mechanism so that bar 82 is then locked in its extreme left end position by the latching engagement with shoulder 141. Further movement of handle 67 then fully opens valve 19. If handle 67 is now released, the pilot latching mechanism is cocked, and the latch piece 79 engaging cam edge 89 will hold the large and small valves 19 and 27 in open position, as hereinbefore described. Striker bar 82 is held in its extreme left or potential position against the bias of spring 85 by the pilot latching means. In this position the striker bar has potential energy due to the tension of spring 85 and when the pilot latch releases bar 82, it will move to the right to release its potential energy.

With the valves 19 and 27 open, liquid flows through the valve and through the meter, and means are provided for unlatching the valves 19 and 27 when a predetermined quantity has passed through the meter. The means disclosed in said Patent No. 2,247,139 may be employed for this purpose. However, in handling high rates of flow through the meter, as for example, flows on the order of 700 gallons per minute, it is objectionable to suddenly shut off the flow, and accordingly I provide means for slowly closing main valve 19 as the predetermined volume is approached, while leaving the small secondary valve 27 open to reduce the flow until the predetermined quantity is reached, whereupon the secondary valve is closed. This means now will be described.

The register case contains a framework 176 (Figures 17 and 18) carrying the register mechanism, the register case being secured at its bottom to the latch case 90 by clamping nuts 177 engaging a flange 178 of the case, whereby the register housing may be swivelled about to face in any desired direction. A meter driven shaft (not shown) passes through the tube 102 and carries a gear at its upper end (not shown) meshing with gear 182 on main drive shaft 183 journalled in the frame 176 and carrying a bevel gear 184 for driving bevel gear 185 on totalizing counter drive shaft 186 which drives a suitable totalizing counter. A suitable worm 187 on shaft 183 co-operating with worm wheel 188 drives unit indicator shaft 189 through a suitable friction coupling.

The reduction shaft 191, which is offset from shaft 186 is frictionally coupled to a gear 192 thereon, which is driven from gear 193 on shaft 189. Pinion 194 on shaft 191 drives the integral spur gear and sleeve 196 rotatably secured on shaft 189, and the indicators or dials 198 and 199 are driven by shaft 189 and gear 196 respectively, to indicate units and sub-total gallons delivered. The drive for the indicators 198 and 199 is more fully described in Patent No. 2,090,269, issued August 17, 1937 to Nelson J. Seibert and Walter H. Parker.

A second worm 202 on shaft 183 co-operates with a worm wheel 203 on the predetermining counter driving shaft 204 which is suitably journalled in a bearing block 205 and has a bevel gear 207 secured at its inner end (Figure 19). The predetermining counter sub-assembly frame is made up of bearing block 205 and a pair of plates 208 secured thereto and to frame 176 by suitable screws (not shown). Spacers 210 at the top having threaded rods 211 therethrough secured at the ends by nuts 212 brace the frame. An intermediate cross shaft 213 is journalled in suitable bushings in said plates and carries a bevel gear 214 adapted to engage and be driven by bevel gear 207 and a spur gear 215 on shaft 213 meshes with the driving spur gear 216 of the predetermining counter wheel assembly. A bowed spring plate 218, abutting gear 215, takes up end play on shaft 213.

The selector or predetermining counter wheel assembly comprises a units counter wheel 221, a tens counter wheel 222 and a hundreds counter wheel 223, all being rotatably journalled on the counter setting shaft 224 and being driven backward during the dispensing operation. Any desired number of counter wheels may be used, depending on the maximum limit desired for the counter. The hundreds counter 223 comprises a numeral cylinder 225 (Figures 20, 21 and 22) preferably made of Celluloid or other suitable material having secured thereon a metal flange 226 with an arcuate notch 227 in its periphery. The corresponding flanges 228 and 229 (Figure 19) of counter wheels 222 and 221 preferably are made of progressively decreased diameter respectively, and the bottoms of notches 230 and 232 thereof preferably are the same distance from the center of the respective counter wheels as the bottom of notch 227. The flange of the tens wheel 22, however, has an additional notch 231. A metal hub 233 extends through the cylinder 225 on which are centered the flange 226, a notched transfer pinion locking plate 234 and a toothed transfer plate 235, the latter having a registering notch 236 in its periphery between two teeth. On the opposite side within the numeral cylinder is a cup shaped ratchet plate 237 having notches 238 in its flange. Rivets 239 hold the plates in assembled relation, and the hub 233 may be swaged to hold it in place, as shown in Figure 20. The tens and unit wheels are of generally similar construction. A transfer gear 240 has a central hole 241 to receive the hub 233, and in assembled position rests on a shoulder 242 on the hub. Gear 240 has pivot pins 243 riveted therein which receive the pawls 244, and in assembled position pawls 244 are received within numeral cylinder 225 and are urged outwardly into engagement with the flange of ratchet plate 237 by a spring 245.

The pawls for the units counter wheel assembly may be suitably secured to the spur gear 216 and may employ the same pawl and ratchet structure as the tens or hundreds transfer gear. Or if desired, a finer pawl and ratchet drive may be employed, as shown in Figure 24, in which case a pair of modified pawls 246 are pivoted on pins 243 in the gear 216 and are held outwardly by cantilever springs 247 hooked around pins 248 and 249. The ratchet plate in this wheel comprises an internal toothed wheel 250 (Figure 24) inserted in the Celluloid numeral wheel 225, and in assembled position as shown in dot and dash lines in Figure 24, the pawls 246 are urged into engagement with ratchet wheel 250.

A shaft 251 (Figures 17 and 20) fixed in the end plates 208 carries loosely mounted mutilated transfer pinions 252 adapted to co-operate with the transfer gears 240 to intermittently drive the tens and hundreds counter wheels. In operation, when spur gear 216 is driven, it drives the units wheel through the ratchet and pawl structure shown in Figures 23 and 24. Each time toothed transfer plate 235 of the units wheel comes to the position adjacent a transfer pinion 252, the notch 236 engages a mutilated tooth thereof and turns the pinion one tooth, this movement being allowed by the notch in locking plate 234, and by the cut away teeth of the pinion. As the teeth of pinion 252 engage transfer gear 240 the tens numeral wheel will be rotated one tooth. On further rotation of the units wheel, the notch 236 becomes disengaged from pinion 252, leaving two complete teeth engaging the periphery of locking disk 234 to prevent rotation of the pinion and gear 240 until the notch 236 again comes around into engagement with pinion 252. Hundreds counter wheel 223 makes one revolution for ten revolutions of tens counter wheel 222, and tens counter wheel 222 makes one revolution for ten revolutions of units counter wheel 221. From the foregoing description it will be apparent that the numeral wheels are driven step by step in one direction by the transfer gears 240 and pawl and ratchet construction, and may rotate in the opposite direction for setting independent of the drive mechanism therefor.

For setting the counter wheels they are each provided with a recess at 253 in the plate 234 and have pawls 254 located therein and pressed inward by bent wire springs 255. Notches 256 in shaft 224 are provided to engage the pawls, the notches being arranged in known manner so that only one pawl can be engaged at any time, and by turning shaft 224 clockwise as seen in Figure 20, the numeral wheel 225 secured to flange 226 and plates 234 and 235 will be rotated, this rotation being allowed by pawls 244 idling over the internal ratchet 237. The counter wheels thus are individually set to deliver the desired or predetermined quantity of fluid.

A weight 260 (Figures 17 and 19) has a yoke 261 secured to one end in any suitable manner and journalled on a shaft 262 passing through suitable holes in the yoke and fixed at its ends in plates 208. A roller shaft 264 is mounted in the yoke and has loosely journalled thereon rollers 265, 266 and 267. When the register wheels 221, 222 and 223 are all set away from zero, the roller 267 rides on the flange 226 and holds the weight 260 in elevated position. By having the weight supported by the counter wheel with the least frequent movement, the load is kept off of the wheels that are turning with greater frequency. It will be apparent that instead of having flanges 226, 228 and 229 of varying diameter, the rollers 267, 266 and 265 may be of varying diameter, or if desired, of the same diameter. When counter wheel 223 turns to zero, roller 267 falls into notch 227, and roller 266 then contacts flange 228 and carries the weight. Notch 231 of the tens wheel is not located opposite zero, but is in advance thereof, preferably opposite numeral eight, so that when notch 231 reaches roller 266 and notch 232 of units counter wheel reaches roller 265 (at which point the reading is 80 units), the weight is allowed to descend, and rod 270, swivelled to pin 271 in weight 260, contacts and depresses floating plate 111 and with it detent pin 159 to trip the latch mechanism in case 90 and thus release bars 118 and 82 for movement to the right (Figure 9). The initial release thus occurs when about eighty units remain to be delivered. The released position of plate 111, weight 104 and release plate 96 are shown in Figure 17.

When thus released, bar 82, which is quite massive, is pulled to the right by spring 85 (Figure 9) and against the follower 75 with considerable force, sufficient to overcome the friction between cam edge 89 and latch piece 79, and pivot the follower to the right to depress latch piece 79 so that cam 70 and stem 36 are released for turning under the bias of the valve springs 33 and 50, tending to close the valves. Valves 19 and 27 thus move slowly toward closed position, the closing movement being damped by fluid in chamber 52 (Figure 2) being forced through openings 54 and 56 in pin 57 to the chamber 60 at the rear end of the valve. As flow continues through the valves to the meter, the meter drives the register so that roller 265 is forced out of notch 232 and rides on flange 229, thus lifting the weight 260 and rod 270 from the floating plate 111. This allows the release plate 96 to raise tube 102 and floating plate 111 so that the pilot latch mechanism in case 90 is set for another latching movement. As the cam 70 continues to turn under the action of springs 33 and 50, the vertical curved track 71 pivots follower 75 counterclockwise, so that rod 82 and bar 118 are again pushed to the left and relatched by the pilot latching mechanism, as previously described. Spring 83 biases follower 75 to the left, thus causing latch piece 79 to move upward into cam recess 88 and the cam continues to rotate until latch piece 79 engages cam edge 88a to prevent further movement of the cam 70 and stem 36. In this position of the latch mechanism, main valve 19 is able to fully close under action of line pressure, and secondary valve 27 is kept from closing by the interlock of extension 79 and cam edge 88a. It will be seen, therefore, that before the full predetermined flow has passed through the meter, the latch mechanism was tripped to allow the main valve 19 to close, while the secondary valve 27 remains open, thus continuing the delivery at a reduced rate of flow, and the pilot latch mechanism has been recocked ready for another release upon completion of the delivery. Continued rotation of the units predetermining counter wheel 221 for ten revolutions causes tens wheel 222 to rotate one-tenth of a revolution, thus moving notch 231 out of engagement with roller 266, so that when notch 232 comes opposite roller 265 the weight 260 will be held elevated. When unit wheel 221 has only one more revolution to go to complete delivery, notches 230 and 227 are brought into alignment opposite rollers 266 and 267, and when the predetermined quantity has passed through the meter the notch 232 is brought opposite roller 265 into line with notches 227 and 230 so that the rollers 265, 266 and 267 fall into the notches, allowing weight 260 to trip rod 270 to again descend to unlatch the pilot latch mechanism and release bar 82. Bar 82 releases the valve latch mechanism, as previously described, and valve 27 closes quickly under the force of springs 33 and 50 and line pressure, thus shutting off delivery.

It will be evident from the above description that the counter or register does not actuate the means for releasing the valve latch operating member 82 from the restraining influence of the pilot latch means 90, but merely controls the gravity movement of the latch tripping rod 270. In the movement of the member 82 by follower 75 to its latched position, in the opening and closing of the valve, energy is stored in the spring 85 and the effective operation of the meter controlled latch tripping rod 270 is not restrained by said spring or the valve springs 33 and 50. In other words, the rod 82 functions independently of the register mechanism to actuate the valve latching means. Thus it is apparent that in the operation of the predetermining mechanism, no appreciable additional load will be imposed upon the meter through the counting or registering mechanism, and maximum accuracy is obtained in the delivery of the liquid in the desired predetermined volume.

The delivery through the large valve 19 is so rapid that where it is desired to deliver a small quantity of fluid, on the order of seventy-nine gallons or less, the retaining or latching means for the large valve 19 preferably is not utilized. For delivering such quantities, the predetermining counter or selector is set for the desired delivery and bar 82 is manually pushed to the left, as shown in Figure 9, to cock the pilot latch mechanism and retain bar 82 in latched position. The handle 67 now is rotated only until the latch piece 79 rises into recess 88 to engage cam edge 88a, and the handle 67 then is released. The small valve 27 thus is retained by the locking engagement of latch piece 79 and cam edge 88a, to allow reduced flow therethrough until the predetermined quantity has been dispensed, whereupon valve 27 is released and closed, as previously described.

The invention may be embodied in other specific forms without departing from the spirit or essential characteristics thereof. The specific form described herein, therefore, is to be considered as illustrative and not restrictive of the invention.

What is claimed and desired to be secured by United States Letters Patent is:

1. In a dispensing apparatus, the combination of a fluid meter, valve means for controlling flow through said meter, means for latching said valve means in open position, pilot latch means for controlling said valve latching means, selector mechanism comprising a plurality of disks having predetermining notches therein driven in different degrees of rotation by said meter, one of said disks having a pretripping notch therein angularly spaced from the predetermining notch on that disk, feeler mechanism adapted to co-operate with said pretripping notch and predetermining notches of the remaining disks to trip said pilot and valve latching means for initiating closing of said valve means when a predetermined quantity of fluid passes through the meter, and means actuated by closing of said valve means rendered effective after predetermined closure of said valve means for resetting said pilot latching means and retaining said valve means in partly open position to allow a reduced flow therethrough, and said feeler mechanism co-operating with said predetermining notches to trip said pilot latching means and release said valve means for complete closure to stop flow therethrough when a further predetermined quantity of fluid passes through said meter.

2. In a dispensing apparatus, a fluid meter, valve means for controlling flow through said meter, a member operably connected for actuating said valve means, pilot latch means for latching said member, an operating stem for said valve means, a cam carried by said operating stem, a follower co-operating with said cam to move said member into latched position, means co-operating with said cam to retain said valve means in open position, a selector actuated by the meter tripping means for said pilot latch means, means in said selector for controlling said tripping means for tripping said pilot latch means when a first predetermined quantity of fluid passes through the meter, means on said cam co-operating with said follower to retain the valve means in reduced flow position, valve actuated means for relatching said member, and further selector means for actuating said tripping means for again tripping said pilot latching means to stop flow through the valve means when a predetermined quantity of fluid passes through said meter.

3. In a dispensing apparatus, a fluid meter, valve means comprising a large valve and a small valve for controlling flow through said meter, a member operably connected for actuating said valve means, an operating stem for said valve means, a cam actuated by said operating stem, a follower co-operating with said cam to move said member into latched position, pilot latch means for latching said member, tripping means for said pilot latch means, a selector actuated by the meter for actuating said tripping means for tripping said pilot latch means to release the large valve when a first predetermined quantity of fluid passes through the meter, means on said cam co-operating with said follower to relatch said member and retain the small valve open to allow a reduced flow through said valve means, and further selector means for again actuating said tripping means for releasing said retaining means to stop flow through said valve means when a further predetermined quantity of fluid passes through said meter.

4. In a dispensing apparatus, a fluid meter, valve means for controlling flow through the meter, an operating stem for said valve means, a cam actuated by said operating stem, a follower co-operating with said cam for retaining said valve means in open position, pilot latch means, a member for releasing said follower adapted to be retained in latched position by said pilot latch means, selector means actuated by the meter to trip said pilot latch means and release said member when a predetermined quantity of fluid passes through the meter, means on said cam co-operating with said follower to retain the valve means in reduced flow position, and further selector means actuated by said meter for releasing said retainer means to stop flow through the valve means when a predetermined further quantity of fluid passes through said meter.

5. In a dispensing apparatus, a fluid meter, valve means for controlling flow through the meter, an operating stem for said valve means, a cam actuated by said operating stem, a follower co-operating with said cam for retaining said valve means in open position, pilot latch means, a member for releasing said follower adapted to be retained in latched position by said pilot latch means, selector means actuated by the meter to trip said pilot latch means and release said member when a predetermined quantity of fluid passes through the meter, means on said cam co-operating with said follower to retain the valve means in reduced flow position to allow a reduced flow therethrough, means on said cam co-operating with said follower to cock said member and pilot latch means during closing movement of said valve means, and further selector actuated means for tripping said pilot latch means to stop flow through the valve means when a further predetermined quantity of fluid passes through said meter.

6. In a dispensing apparatus, a fluid meter, valve means comprising a large valve and a small valve for controlling flow through the meter, an operating stem for said valve means, valve retaining means comprising a cam actuated by said operating stem and a follower co-operating with said cam for retaining said valve means in open position, a member for releasing said valve retaining means, means on said cam co-operating with said follower adapted to move said member into potential position, pilot latch means for latching said member in potential position, tripping means for said latch means, selector means actuated by the meter and controlling said tripping means to trip said pilot latch means and release said member to release said large valve when one predetermined quantity of fluid passes through the meter, means on said cam co-operating with said follower to retain the small valve in open position to allow a reduced flow, and said selector means having means for effecting a second operation of said tripping means to trip said pilot latch means to release the small valve and stop flow therethrough when a further predetermined quantity of fluid passes through the meter.

7. In a dispensing apparatus, the combination of a fluid meter, valve means for controlling flow therethrough, means controlling the closure of said valve means including pilot latching means, a striker member held in fixed potential position by said pilot latching means, means actuated upon closing movement of said valve means for moving said striker member to potential position and cocking said pilot latching means, means for latching said valve means in reduced flow position, and means for tripping said pilot latching means when a predetermined quantity of fluid passes through the meter.

8. In a dispensing apparatus, the combination of a fluid meter, valve means for controlling flow through said meter, manual means to open said valve means, means for latching said valve means in open position, a selector actuated by the meter for tripping said valve latching means when a predetermined quantity of fluid passes through the meter, means actuated by the valve means during closing movement of the valve means for relatching said valve means in partly open position to allow a reduced flow therethrough, and means to trip said valve latching means to stop flow therethrough when a predetermined quantity of fluid passes through said meter.

9. In a dispensing apparatus, the combination of a fluid meter, valve means for controlling flow through the meter comprising a small valve coupled by a lost motion connection to a large valve, manual means to first open the small valve and then to open the large valve, means for latching said valve means in open position, tripping means for said latching means, a selector actuated by the meter and controlling said tripping means to trip said valve latching means when one predetermined quantity of fluid passes through the meter, said valve latching means including means operative in the closing movement of the large valve to relatch the small valve in open position while the large valve is closed to allow a reduced flow through the valve means, and said selector having means to cause a second operation of said tripping means and trip said valve latching means to stop flow through said valve means when a further predetermined quantity of fluid passes through said meter.

10. A dispensing apparatus as specified in claim 9, wherein said large valve comprises a shielded cylindrical member, and a reduced flow means is provided for cushioning the closing movement of the large valve.

11. A dispensing apparatus as defined in claim 9, wherein said lost motion includes compressible spring means between the large and small valves adapted to be compressed upon opening of the small valve and move the large valve from its seat.

12. In a dispensing apparatus, the combination of a fluid meter, valve means for controlling flow through the meter comprising a small valve coupled by a lost motion connection to a large valve, manual means to first open the small valve and then to open the large valve, means for latching said valve means in open position, a selector actuated by the meter for tripping said valve latching means when a predetermined quantity of fluid passes through the meter, means for retaining the small valve in open position while the large valve is closed to allow a reduced flow through the valve means, and means to trip said valve retaining means to stop flow through the valve means when a predetermined quantity of fluid passes through the meter.

13. In a dispensing apparatus, the combination of a fluid meter, valve means for controlling flow through the meter comprising a small valve and a large valve, means for latching said valve means in open position, selector mechanism comprising a plurality of disks driven in different degrees of rotation by said meter having notches therein and feeler mechanism adapted to cooperate with said notches to selectively trip the latching means for the large valve when a predetermined quantity of fluid passes through the meter, the small valve being latched in open position to allow a reduced flow through the meter, said feeler mechanism cooperating with said notches to trip the latching means for the small valve to stop flow therethrough when a further predetermined quantity of fluid passes through said meter.

14. In a dispensing apparatus, a fluid meter, a large valve and a small valve for controlling flow through the meter, means for retaining the large valve and small valve in open position, a pilot latch, valve releasing means held by the pilot latch, pilot latch tripping means, selector means actuated by the meter and having means cooperating with the pilot latch tripping means to trip the pilot latch and release the large valve when a predetermined quantity of fluid passes through the meter, means for recocking said valve releasing means and pilot latch, and said selector having additional means cooperating with the pilot latch tripping means to trip the pilot latch and release the small valve when a predetermined quantity of fluid passes through the meter.

15. In a dispensing apparatus, a fluid meter, valve means for controlling flow through said meter, a control member for said valve means, pilot latch means for latching said member, an operating stem for said valve means, a cam carried by said operating stem, a follower cooperating with said member and cam and actuated by the cam in the opening and closing movements of said valve means to move said member into latched position, means on the follower cooperating with said cam to retain the valve means in open position, means on the cam cooperating with said means on the follower to limit closing movement of the valve means and retain the same in reduced flow position, means for tripping said pilot latch means to permit closing of said valve means; a selector actuated by the meter and actuating said tripping means in a plurality of sequential operations to release said pilot latch means, and means for actuating said control member upon each release of said pilot latch means to effect complete plural stage closure of the valve means and predetermine the quantity of fluid passing through the meter in each delivery cycle.

16. In a dispensing apparatus, a fluid meter, valve means comprising a large valve and a small valve for controlling flow through said meter, a member controlling closure of said valve means, an operating stem for said valve means, a cam actuated by said operating stem, a follower cooperating with said member and cam and actuated by the cam in the opening and closing movements of said valve means to move said member to one position, pilot latch means for latching said member in said position, said cam and follower having coacting parts to retain both valves in open position and said cam having additional means to coact with said part of the follower and retain the small valve in open position after the large valve has closed, means for tripping said pilot latch means, a selector actuated by the meter for actuating said tripping means in a plurality of sequential operations to release said pilot latch means, and means for actuating said control member upon each release of said pilot latch means to operate said follower and release the large and small valves for movement to closed position at relatively different times in the delivery cycle of the meter.

17. In a dispensing apparatus, a fluid meter, valve means for controlling flow through the meter, an operating stem for said valve means, a cam actuated by said operating stem, a follower having means cooperating with said cam to retain the valve means in open position, pilot latch means, a member retained in latched position by said latch means and, upon release thereof, coacting with the follower to release the valve means for movement toward closed position, said follower restoring said member to latched position, means on said cam cooperating with the retaining means on the follower to arrest closing movement of the valve means and retain the same in flow reducing position, tripping means for said pilot latch means, and meter operated means controlling said tripping means to repeatedly actuate said latch means and release said member, whereby plural stage closure of the valve means is effected in each delivery cycle of the meter.

18. The combination defined in claim 17, wherein said member is spring actuated in valve releasing direction and means is provided on the cam coacting with the follower and operative in the opening and closing movements of the valve means to position said member for engagement by said pilot latch means.

19. Fluid dispensing apparatus comprising a fluid meter, a register mechanism actuated by said meter, valve means controlling fluid flow through said meter, latch means connected with the valve means for holding said valve means partially or fully open, means controlled by the register mechanism including means energized independently of said mechanism for releasing said latch means after a predetermined amount of fluid has passed said meter and initiating closing of said valve means, said latch means being operable by the valve means to arrest closing movement of said valve means and relatch the same in partially open position permitting reduced fluid flow, and said register controlled means sequentially operating to again release said latch means for permitting full closure of said valve means.

20. In multiple stage predetermining mechanism for fluid meters having fluid control valve means; a manually operable member for opening said valve means, a relatively movable element having latching means to coact at different times with spaced parts of said member and retain the valve means in fully or partially open position, additional coacting means on said member and element operable to relatively move said element in the same direction in the valve opening and closing movements of said member in reverse directions and position said latching means in coacting relation with one of said spaced parts, and meter controlled mechanism including a control member operatively engaged with said element to repeatedly actuate said element to latch releasing position in each operating cycle of the meter and effect complete closure of the valve means in a plurality of stages.

21. The predetermining mechanism defined in claim 20, in which energy storing means is connected with said latch releasing member and rendered effective to independently actuate said member in each movement of said element to latching position.

22. The predetermining mechanism defined in claim 20, in which the meter controlled mechanism also includes releasable restraining means for said latch releasing member, and means to independently operate said member upon release of said restraining means, said latching element, upon each movement to latching position, coacting with said latch releasing member to position the same for effective engagement by said restraining means, and simultaneously condition said operating means to actuate said latch releasing member upon release of said restraining means.

23. In multiple stage predetermining mechanism for fluid meters having fluid control valve means; a manually operable member for opening said valve means, a relatively movable element having latching means to coact at different times with spaced parts of said member and retain the valve means in fully or partially open position, additional coacting means on said member and element operable to relatively move said element in the same direction in the valve opening and closing movements of said member in reverse directions and position said latching means in coacting relation with one of said spaced parts, a member actuated in one direction by said element in each movement thereof to latching position, means releasably restraining movement of said latter member from such actuated position, in the opposite direction, register controlled means for releasing said restraining means at predetermined times in each operating cycle of the meter, and means controlled by said restraining means and rendered effective upon release thereof to move said latter member in said opposite direction and actuate said element in latch releasing direction.

24. The predetermining mechanism defined in claim 23, in which said last named means is an energy storing device rendered effective to actuate said member in latch releasing direction when said member is moved by the latching element into cooperative engagement with said restraining means.

25. In a dispensing apparatus, the combination of a fluid meter, valve means for controlling flow through said meter, valve latching means for latching said valve means in open position, a striker member, pilot latching means for latching said striker member in fixed potential position, selector means actuated by said meter, means controlled by said selector for rendering said striker means operable for tripping said pilot latching means when a predetermined quantity of fluid passes through the meter, means responsive to operation of said meter for relatching said striking member in potential position, means actuated by closing of said valve means for relatching said valve means in reduced flow position, and further selector means actuated by said meter for again rendering said striker means operable for tripping said pilot latching means when a predetermined further quantity of fluid passes through the meter.

EINAR THORESEN.
WALTER H. MARSH.